United States Patent [19]

Vany

[11] Patent Number: 4,556,312

[45] Date of Patent: Dec. 3, 1985

[54] OPTICAL PRINTING DEVICES FOR PRINTING ON BLANKS WHICH ARE INTENDED FOR SWAGING

[75] Inventor: Gerard Vany, Malicorne-sur-Sarthe, France

[73] Assignee: Cebal, Clichy, France

[21] Appl. No.: 624,666

[22] PCT Filed: Nov. 8, 1983

[86] PCT No.: PCT/FR83/00221
§ 371 Date: Jun. 13, 1984
§ 102(e) Date: Jun. 13, 1984

[87] PCT Pub. No.: WO84/02008
PCT Pub. Date: May 24, 1984

[30] Foreign Application Priority Data

Nov. 10, 1982 [FR] France .................. 82 19353

[51] Int. Cl.$^4$ ............................................. G03B 27/68
[52] U.S. Cl. ................................. 355/47; 355/49; 355/52; 350/442
[58] Field of Search ................... 355/52, 47, 49; 350/442, 443, 286

[56] References Cited

U.S. PATENT DOCUMENTS

| | | | |
|---|---|---|---|
| 1,669,027 | 5/1928 | Seymour | 355/52 |
| 3,073,210 | 1/1959 | Packard | 355/47 |
| 3,238,909 | 3/1966 | Kendall | 355/47 |
| 3,314,329 | 4/1967 | Wolbert | 355/52 X |
| 3,627,412 | 12/1971 | Jean | 355/52 X |
| 3,964,910 | 6/1976 | Geist et al. | 355/47 X |
| 4,119,484 | 10/1978 | Schiffman | 355/49 X |

FOREIGN PATENT DOCUMENTS 1904388 8/1970 Fed. Rep. of Germany .
2453432 10/1980 France .

*Primary Examiner*—L. T. Hix
*Assistant Examiner*—Brian W. Brown
*Attorney, Agent, or Firm*—Dennison, Meserole, Pollack & Scheiner

[57] ABSTRACT

A device is disclosed for printing on blanks which are intended for swaging, to obtain a predeformed image on the blanks which, following swaging, will reconstitute the original image. The device comprises a light source (2), a toric prism (4) and a camera (8) having a common optical axis (12). The angle of the toric prism is smaller than 42.05°, and the surface (11) of the prism facing the camera (8) forms a linearity correction lens.

4 Claims, 8 Drawing Figures

OPTICAL PRINTING DEVICES FOR PRINTING ON BLANKS WHICH ARE INTENDED FOR SWAGING

The invention concerns an improvement to be applied to optical printing devices for printing on blanks which are intended for the manufacture of cans by swaging.

Cans are decorated either by means of a strip of paper which is preprinted and wound around and glued onto the can, or by direct printing on the can, or else by printing of the blank which is then to produce the can by swaging.

In this case, the blank generally must be printed with a predeformed image in such a manner that the original image will be reconstituted following the swaging.

Optical apparatuses to obtain a predeformed image have been described in prior documents, particularly in U.S. Pat. Nos. 3,238,909, 3,314,329, 3,964,910, 4,119,484 and in FR Pat. No. A-1 590 126 (corresponding to U.S. Pat. No. 3 627 412) in the name of the applicant, as well as in FR Pat. No. A-2 453 432, in the name of FEREMBAL, which uses a flexible reflecting strip as optical element, turning on the axis of the optical system around the can which is being formed.

Presently, the requirements of users regarding the quality of printing (accuracy, contrast, restoration of colors, etc.) are no longer entirely satisfied by known optical devices; the legibility of texts in small characters, for example, is not always assured. In four-color printing, a lack of clarity has been noted, which requires stopping down of diaphragm aperature so as to increase the depth of the field, thus increasing the exposure time; it was then noted that the diffused light attenuates the shadows in the vicinity of the light zones, which gives a "milky" appearance to the print.

The object of the present invention is an improvement of the anamorphic optical system, which is the object of our French Pat. No. FR-A-1 590 126. In this patent, a printing apparatus is described for printing a predeformed image on swaging blanks, characterized in that it comprises essentially: a toric prism and an aspherical and revolving lens, associated with an achromatic photographic objective of very great focal length.

The toric prism is realized with a very transparent material such as methyl polymethacrylate.

The improvement consists of associating the toric prism and the correction lens in one monolithic element, the prism solely assuring the function of reflection of the light rays, and the lens effecting the optical corrections assuring the linearity of the swaged image. Also, the angle of the prism has been determined in such a manner as to obtain total reflection of the light rays emitted by the source.

FIGS. 1 to 8 illustrate the application of the invention, mainly illustrating the general principle of the invention.

When a can is swaged from a flat, circular blank, it is noted that each point marked on the flat surface of the blank then corresponds to one point on the surface of the swaged can. A relation thus exists between the prior position, on the blank, of any one point of the surface of the metal, and the final position on the swaged can. Then by knowing this relation, it is possible to print the blank before deformation in such a manner that during the swaging the drawing is subject to a deformation such that the desired picture is obtained. In a practical manner, a label which can be wound around the can is generally used; the blank should then be printed in such a manner that, following swaging, a can is decorated with the same picture as if the label had been wound around it.

If the conversion which makes the points of the blank correspond to those of the can is T, then:

blank→(T)→can and the process consists of optically making the inverse conversion $T^{-1}$ so as to obtain a deformed image from a label, to be used for the printing of the blanks:

label→($T^{-1}$)→blank.

By starting with a lable, and proceeding with these conversions, a can is obtained which is truly of the same appearance as the label:

label→($T^{-1}$, optic)→blank→(T, swaging)→can.

To determine the function I, a printed blank is swaged which has a grid of lines forming a system of coordinates to mark the position of a point both before and after swaging.

In the case of round cans, a system of polar coordinates (r, θ) is used for the blank, and the position of the points on the can after the swaging is then marked by a system (p, θ) wherein p is the position of a point measured on a generatrice of the can from the bottom. It is then possible to consider that the conversion T is summarized in a relation between r and p. In fact, it is preferable to consider the value $t = r - r_o$, wherein $r_o$ is the radius of the can, and one then has a relation between the number of lines (in mm) and their position on the outside of the can.

It must be noted that the conversion T which is thus obtained experimentally by plotting depends upon the conditions of the experiment (quality of the metal, the grid lines, and condition of the tools, etc.). Thus, to subsequently obtain good results, one must repeat this experiment in conditions nearest those which will be used in industrial practice. One must therefore swage a sufficient number of cans with the definitive metal to reproduce the conditions of an assembly line production, and one must also pay attention to the centering of the blank which carries the system of coordinates r, θ (r varying from mm to mm).

The final result is then summarized in a table giving the values of p corresponding to each of the values of t. This table, completed by a dimensional summary survey of the can, allows realization of the optical system effecting the conversion $T^{-1}$.

FIG. 1 shows a longitudinal cross section of the optical device described in FR Pat. No. A-1 590 126.

Figure 1:
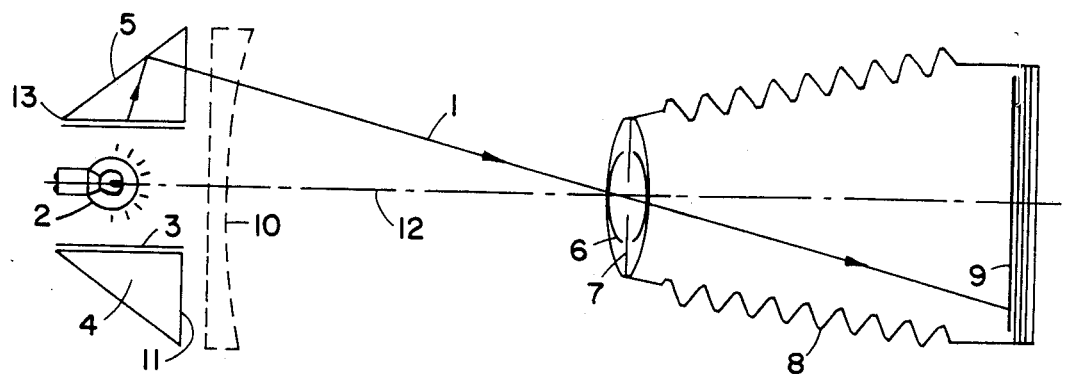

The light rays (1) emitted from the source (2) pass through the transparent plate (3) which carries the image to be reproduced, then passes through the toric prism (4) of which the outside is silver- or aluminum-coated. The rays then pass through the lens (6) and the diaphragm (7) of the camera (8) and on the sensitive flat lens surface (9) come to form the anamorphic of the image of plate (3).

In FR Pat. No. A-1 590 126, the optical corrections were provided by an additional lens (10) shown in broken line, and placed at a certain distance in front of prism (4).

According to the present invention, this additional lens (10) is deleted, and the shape of the surface (11) of toric prism (4) facing the camera is modified to assure the optical corrections. The common optical axis of the system is shown by line (12). Besides, prism (4) is preferably of methyl methacrylate, and silver- or aluminum-coating of its outside (5) is difficult to realize and remains very fragile. To overcome this drawback, the angle of the prism, which was originally 45°, is modified in such a manner that the light rays are subject to total reflection. As a modification of the invention, it is also possible to first realize the prism-lens correction assembly in two pieces and then to combine them in one monolithic block, preferably without using any connector such as glue, by very finely polishing the two contact surfaces (front surface of the prism, rear surface of the lens), so that there is perfect contact between the two surfaces without interposition of a layer of air.

This variation allows for an assembly of interchangeable lenses cut according to the different profiles to take into account the particular features of each type of can to be printed; it also allows easier cutting of the lens, because the toric prism is not easily fixed on the tooling machine.

The angle of the prism is determined in the following manner:

H the height of the prism,
h the height of the can (i.e. of plate 3),
$\Phi_o$ the inside diameter of toric prism (4),
F the focal length of the lens (6),
A the staggering of the base of plate (3), representing the drawing to be reproduced, in relation to the edge (13) of the prism, because it is not possible to have h=H, as the last 3 or 4 millimeters of the end and top parts of the prism cannot be used, in practice.

The critical angle of the methyl polymethacrylate (of which the refraction index is n=1493) is:

$$\alpha_o = \text{Arc.sin} \frac{1}{1,493} = 42,05° \tag{a}$$

Thus it is necessary to choose an angle smaller than 42.05° to assure total reflection. The best results are obtained with $\alpha < 35°$, and, preferably between 35° and 32°.

Let $\alpha$ be the angular value of which the angle is decreased from 45° for total reflection. The end reflection point is that which corresponds to the top of the can (crimping area).

Let $h_o$ be this height:

$$tg\ \alpha \# \frac{1}{2F} \left[ \frac{\Phi_o}{2} + (A + h_o)\ tg\ (45 - \alpha) \right] \tag{b}$$

(N.B.: The I/O optical enlargement is only slightly different from 1, from whence the division of 2F).

$\alpha$ can be determined very approximately by allowing that tg (45−α) #1, and thus alpha #0, wherein:

$$tg\ \alpha \# \frac{1}{2F} \left( \frac{\Phi_o}{2} + A + h_o \right) \tag{c}$$

NUMERIC APPLICATION AND COMPUTATION OF THE VALUE OF A

One takes $\Phi_o = 68$ mm, $h_o = 28$ mm. H=60 mm is set to be sure that all of the rays are reflected. The focal length of the objective is F=480 mm.

(N.B.: the value of F=480 mm is given as a nonlimiting example).

One has:

$$A \approx \frac{\Phi}{2} \times \frac{1}{2F} \times H = \sim 2\ mm \tag{d}$$

which can be rounded to 3 mm, according to the results of experiments.

$$\alpha = \text{Arc}\ tg \frac{1}{2 \times 480} \left( \frac{68}{2} + 3 + 28 \right) = 3,87° \tag{e}$$

The angle of the prism thus must be less than: 45°−3.87°=41.17°.

For safety, a prism of 35° angle will be adopted. It is now possible, from this data, to calculate the precise value of A.

One has:

$$tg\ \alpha = \frac{1}{2F} \left[ \frac{\Phi_o}{2} + (A + h_o)\ tg\ 45 - \alpha \right] \tag{f}$$

Figure 4:
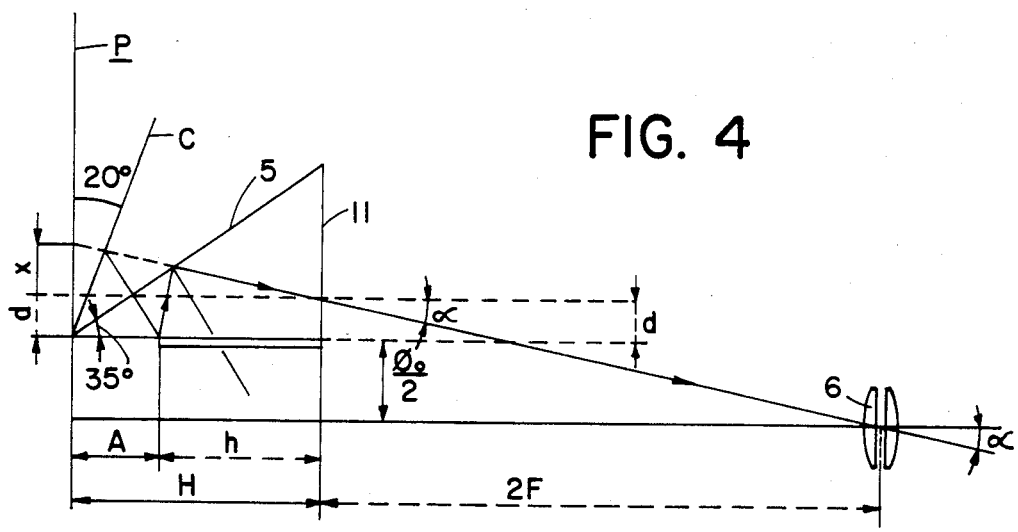

According to FIG. 4, one has:

$$tg\ \alpha = x/H \tag{g}$$

Because of the reduction of the angle of the prism from 45° to 35° the virtual image of the plate, which was formed on the plane P, is now formed on a cone C which forms an angle of 2=20° (FIG. 4) with the plane P.

$$\cos 2\alpha = \cos 20° \approx \frac{x + d}{A}$$

and consequently $$A = \frac{x + d}{\cos 20°} = \frac{H \cdot tg\ \alpha + d}{\cos 20°} \approx \frac{H \frac{\Phi_o/2}{2F} + d}{\cos 20°} \tag{h}$$

For d=1 mm, one has:

$$A = \frac{1}{\cos 20°} H \cdot \frac{\Phi_o}{2} \cdot \frac{1}{2F} + 1 \tag{i}$$

with
F=480 mm
$\Phi_o$=68 mm
$h_o$=28 mm
H=60 mm
is found:
A=3,325 mm
A=5 mm will be adopted in practice.

COMPUTATION OF THE CORRECTION TO BE APPLIED TO SURFACE (11)

It now has to do with the calculation of the shape of surface (11) of the prism to assure the optical corrections. The plane of virtual image P has become a cone C of virtual image, and the projection of this cone on the vertical plane (FIGS. 5 and 6) is going to be considered with reference to a similar case.

The degree of enlargement $\gamma$, which, in the case of a flat surface (11) and an $\alpha$ angle=45°, for a given point, would be:

$$\gamma = \frac{\Phi_o}{\Phi_o + 2A} \quad (j)$$

as a result of the projection becomes:

$$\gamma = \frac{\Phi_o}{\Phi_o + 2A \cos 20°} \quad (k)$$

Figure 5:
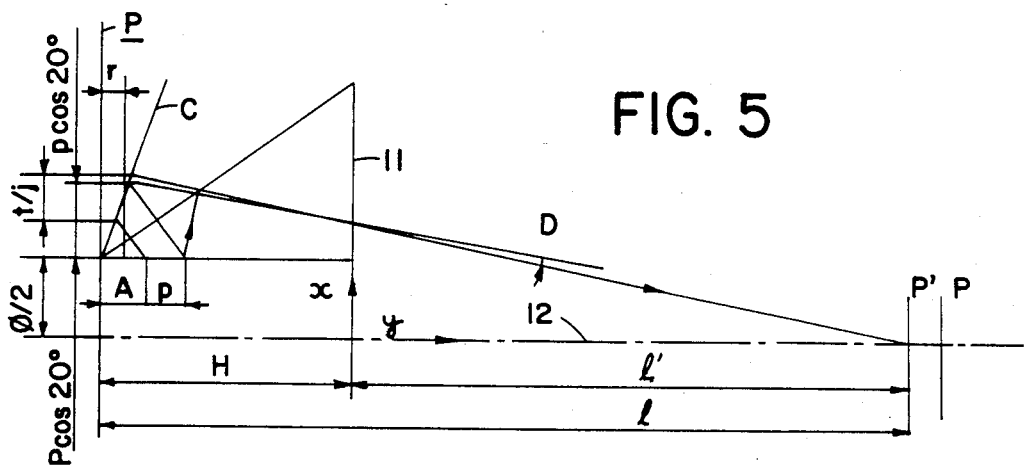
Figure 6:
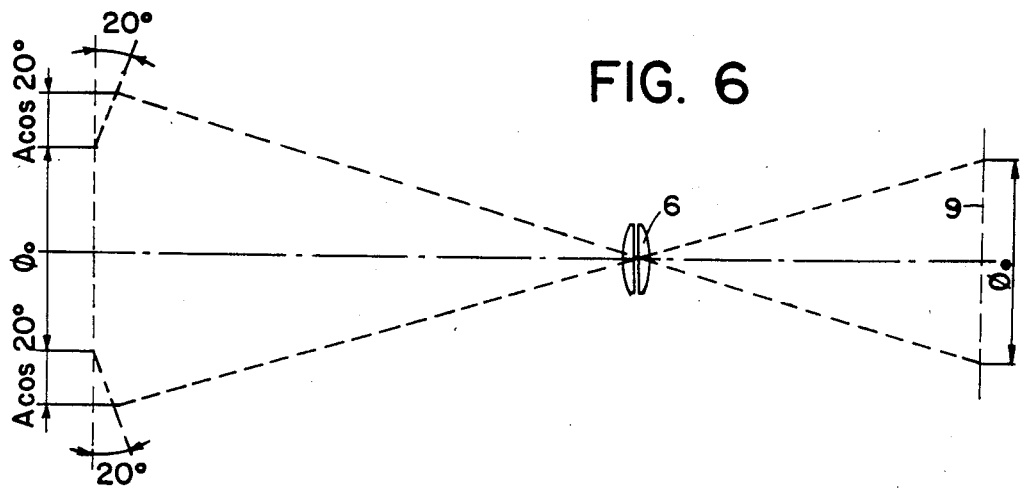

In accordance with the formula of the centered systems $$\left(\frac{1}{z} + \frac{1}{z'} = \frac{1}{F}\right), \text{ or } \frac{z+z'}{zz'} = \frac{1}{F}, \text{ one has:}$$

$$z = F\left(1 + \frac{1}{\gamma}\right) \text{ avec } z = l - r \quad (l)$$

wherein r is the staggering of the plane of the virtual image given by the prism+surface playing the role of lens system, and consequently:

$$F\left(1 + \frac{1}{\gamma}\right) + r = l \quad (m)$$

wherein l is the distance between the edge of the prism and the objective (FIG. 5). To determine r, one must know the optical path passed through by the ray in the methyl polymethacrylate (FIG. 6).

When the advance of different rays in the prism is represented, it is clear that r varies as a function of p (defined above, as the position of a point measured on a generatrice of the can from the bottom). But this value of r depends upon the incidence of the ray on the surface, this being known only when its coordinates x and y are calculated. That is why r is determined approximately in the following manner:

$$nH = H - nr \rightarrow r = H\left(\frac{n-1}{n}\right) \quad (n)$$

Figure 7:
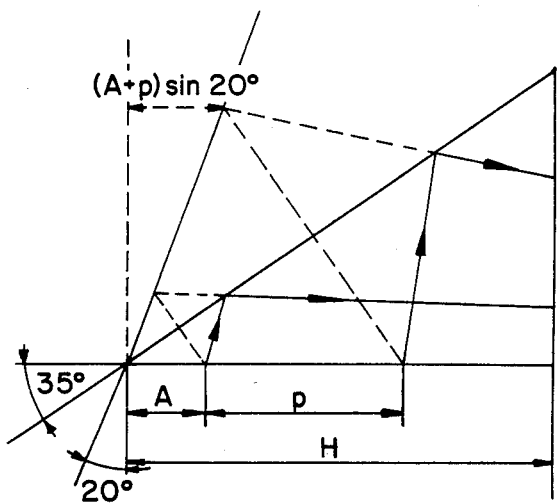
Figure 8:
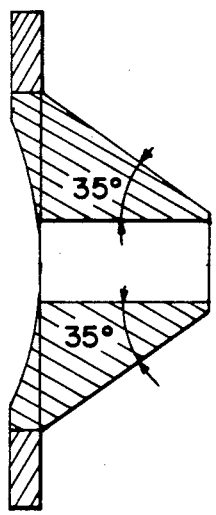
FIG. 8 shows the cross section of a prism realized according to the invention.

Therefore, one has (FIG. 7):

$$n[H - (A + p)\sin 20°] = [H - (A + p)\sin 20°] + nr \quad (o)$$

and consequently $$r = \frac{n-1}{n}[H - (A + p)\sin 20°]$$

The approximation of the surface for the prisms with small angles gives the following:

$$D = \frac{\delta}{H - r}$$

with $\delta$=displacement in the vertical projection of the virtual cone.

$$\delta = p \cos 20° - \frac{t}{\gamma} \quad (p)$$

Also, if the angle of the tangent to the surface of the lens is called $\beta$:

$$D = (n - 1)\beta \rightarrow \beta = \frac{p \cos 20° - t/\gamma}{(n - 1)(H - r)} = \frac{\Delta y}{\Delta x} \quad (q)$$

then, consequently:

$$y_t = y_{t-1} + (x_t - x_{t-1})\frac{p \cos 20° - t/\gamma}{(H - r) - n - 1)} \quad (r)$$

and $$x_t = \frac{\Phi_o}{2} + A \cos 20° + t\frac{l'}{l - r} \quad (s)$$

knowing that $l' = l - H$ $$x_t = \frac{\Phi_o}{2} + A \cos 20° + \frac{t}{\gamma}\frac{l - H}{l' - r} \quad (t)$$

$x_t$ and $y_t$ are therefore parametric coordinates which define the form of the surface (11) of the prism, cut as a corrective lens, and the axis y is the optical axis (12) of the system. The reference plane (x, y) is selected arbitrarily. This can be the surface (11) of the prism before cutting, or any other plane, parallel to this surface, for example defined by the value H.

The use of the coordinates $x_t$, $y_t$ to define the front surface of the prism will easily lend itself to working by digital control.

NUMERIC APPLICATION

Starting from $\phi_o = 68$ mm; A=5 mm; F=480 mm; n=1493 mm; H=60 mm and $2\alpha = 20°$, a certain number of parameters $C_1$ to $C_4$ are first determined.

Number of $C_1$ to $C_4$ parameters:

$$C_1 = \Phi_o/2 + A \cos 20° = 36,70 \quad (u)$$

$$C_2 = \frac{\Phi_o}{\Phi_o + 2 A \cos 20°} = 0,878$$

$$C'_1 = F\left(1 + \frac{1}{C_2}\right) = 1026,33$$

$$C'_2 = [(H - A \cdot \sin 20°)]\frac{(n - 1)}{n} = 19,24$$

$$C_3 = \frac{C_1 + C_2 - H}{C_1} = 0,960$$

$$C_4 = (H - C'_2)(n - 1) = 20,1$$

$y_o = 0$ (which corresponds to the reference surface of the prism)
$x_o = C_1 \cdot C_3 (= 35.23)$,
and then for each pair (p, t) is calculated:

$$C_2 = [H - (A + p) \sin 20°] \frac{(n-1)}{n} \quad \text{(v)}$$

$$C_3 = \frac{C_1 + C_2 + H}{C_1}$$

$$C_4 = (H - C_2)(n - 1)$$

Recalling that t has been defined above, in relation to the polar coordinates (r, θ), as $t = r - r_o$, $r_o$, being the radius of the can, (see FIG. 2), one has:

$$x_t = \left( C_1 + \frac{t}{C_2} \right) C_3 \quad \text{(I)}$$

$$y_t = y_{t-1} + (x_t - x_{t-1}) \frac{p \cos 20° - t/C_2}{C_4} \quad \text{(II)}$$

PRACTICAL EXAMPLE OF COMPUTATION OF THE FRONT SURFACE OF THE LENS

A can carrying a system of polar coordinates and obtained by swaging is considered.

Figure 2:
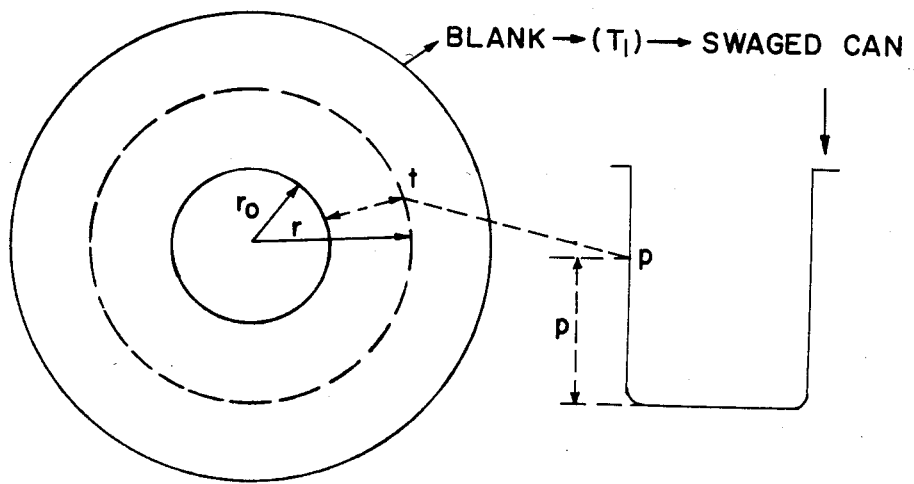
FIG. 2 is a diagram of the conversion by swaging of a point t of the blank into a point p of the can.
Figure 3:
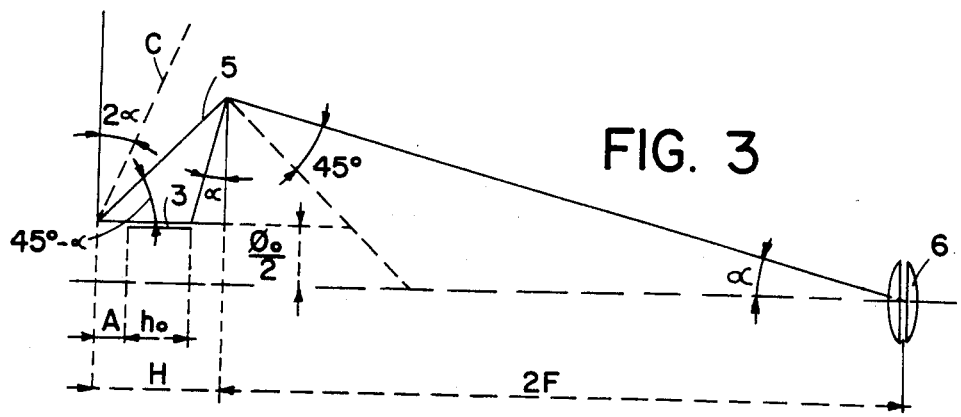
FIGS. 3 to 7 show the passage of the light rays in the optical device, object of the invention.

The values of p correspond to the values of t on the blank (FIG. 2). The value t=0 is given in the first visible circle on the bottom of the can placed on a face plate. p=0 is associated with t=0, from which originate the measures. For a can of H=28 mm, it is possible to set 20 values for t/p pairs.

On a can of 68 mm diameter and 28 mm height, with an objective of 480 mm focal length, the parameters $x_t$ and $y_t$ are obtained for each t/p pair.

TABLE I

| t | p | $x_t$ | $y_t$ |
|---|---|---|---|
| 0 | 0 | 36,2441 | 0,0000 |
| 1 | 1,02 | 37,3057 | −0,0080 |
| 2 | 2,14 | 38,3665 | −0,0191 |
| 3 | 3,1 | 39,4279 | −0,0411 |
| 4 | 4,36 | 40,4876 | −0,0591 |
| 5 | 5,58 | 41,5471 | −0,0752 |
| 6 | 6,86 | 42,6061 | −0,0865 |
| 7 | 8,04 | 43,6653 | −0,0978 |
| 8 | 9,26 | 44,7239 | −0,1072 |
| 9 | 10,4 | 45,7827 | −0,1186 |
| 10 | 11,76 | 46,8400 | −0.1214 |
| 11 | 13,08 | 47,8972 | −0,1176 |
| 12 | 14,42 | 48,9540 | −0,1063 |
| 13 | 15,76 | 50,0104 | −0,0874 |
| 14 | 17,16 | 51,0661 | −0,0584 |
| 15 | 18,56 | 52,1215 | −0,0192 |
| 16 | 19,94 | 53,1767 | −0,0291 |
| 17 | 21.26 | 54,2319 | −0,0838 |
| 18 | 22,52 | 55,2871 | −0,1418 |
| 19 | 23,94 | 56,3410 | −0,2107 |
| 20 | 24,8 | 57,3983 | −0,2647 |

Starting from parameters $x_t$ and $y_t$, it is now possible to determine the coordinates X and Y defining the shape of the lens, from the formulas I and II.

The values, calculated on computer, are indicated in Table II. The front surface of the lens has a 140 mm diameter, but the shape applies only to a diameter of 120 mm. The profile has been determined from 25 points for which the values of X are given along the radius of the lens and Y (side of the shape).

TABLE II

| | X | Y |
|---|---|---|
| 1 | 0,0000 | 0,0000 |
| 2 | 10,0000 | 0,0000 |
| 3 | 20,0000 | 0,0000 |
| 4 | 34,0000 | 0,0000 |
| 5 | 36,2441 | 0,0000 |
| 6 | 37,3057 | −0,0080 |
| 7 | 38,3665 | −0,0191 |
| 8 | 39,4279 | −0,0411 |
| 9 | 40,4876 | −0,0591 |
| 10 | 41,5471 | −0,0752 |
| 11 | 42,6061 | −0,0865 |
| 12 | 43,6653 | −0,0978 |
| 13 | 44,7239 | −0,1072 |
| 14 | 45,7827 | −0,1186 |
| 15 | 45,8400 | −0,1214 |
| 16 | 47,8972 | −0,1176 |
| 17 | 48,9540 | −0,1063 |
| 18 | 50,0104 | −0,0874 |
| 19 | 51,0661 | −0,0584 |
| 20 | 52,1215 | −0,0192 |
| 21 | 53,1767 | 0,0291 |
| 22 | 54,2319 | 0,0838 |
| 23 | 55,2871 | 0,1418 |
| 24 | 56,3410 | 0,2107 |
| 25 | 57,3983 | 0,2547 |

The use of a prism, of which surface (11) has been shaped as indicated above, has furnished clear prints, contrasted and without geometric errors. In particular, the tests carried out with exposures on Kodak "Ektachrome" and screens of 133 lines per inch have shown an excellent color restitution, absence of any diffusion and parasitic light reflections, and excellent contrast of the image and an absence of deformation of the screen.

I claim:

1. Device for the printing of blanks which are intended for swaging, to obtain a preformed image on the blanks which, following swaging, will reconstitute the original image, comprising a light source, a toric prism, and a camera having a common optical axis, the angle of said toric prism being less than 42.05°, and said toric prism having a surface facing said camera forming a linearity correction lens, the cutting of said lens-forming surface being defined, in a system of parametric coordinates $x_t$ and $y_t$ centered on the intersection point of the optical axis, and by a reference plane parallel to said surface of the prism, defined by the equations:

$$x_t = \left( C_1 + \frac{t}{C_2} \right) C_3$$

$$y_t = y_{t-1} + (x_t - x_{t-1}) \frac{p \cos \alpha - t/C_2}{C_4}$$

the $C_1$, $C_2$, $C_3$, and $C_4$ parameters being defined from the inside diameter $\Phi_o$ and the height H of toric prism, from the offset A of the plate to be reproduced in relation to the edge of the prism, from the focal length F of the lens of camera and from the refraction index n of the material forming the prism and from the top angle (45 − α) of said prism.

2. Printing device as in claim 1, wherein the angle of said toric prism is between 35° and 32°.

3. Printing device as in claim 1 or 2, wherein the lens and the prism are obtained by simultaneous cutting in one single system.

4. Printing device as in claim 1 or 2, wherein the lens and the prism are obtained by separate cutting and very fine polishing of the facing surfaces, which are then placed in contact so as to form a monolithic block.

* * * * *